United States Patent [19]

Godin et al.

[11] 4,118,273

[45] Oct. 3, 1978

[54] MANUFACTURE OF PERLITE INSULATING BOARD ON A CYLINDER MACHINE

[75] Inventors: Gilbert Godin, Lebanon; Fred C. Norgard, Somerville, both of N.J.

[73] Assignee: Johns-Manville Corporation, Denver, Colo.

[21] Appl. No.: 507,640

[22] Filed: Sep. 20, 1974

Related U.S. Application Data

[63] Continuation of Ser. No. 259,703, Jun. 5, 1972, abandoned.

[51] Int. Cl.² .............................................. D21D 3/00
[52] U.S. Cl. .................................... 162/171; 162/175; 162/181 C
[58] Field of Search ............... 162/181 R, 181 C, 145, 162/175, 171

[56] References Cited

U.S. PATENT DOCUMENTS

| | | | |
|---|---|---|---|
| 2,971,878 | 2/1961 | Heilman et al. | 162/181 C |
| 3,042,578 | 7/1962 | Denning | 162/171 |
| 3,701,672 | 10/1972 | Ruff | 162/171 |

OTHER PUBLICATIONS

Casey, "Pulp & Paper", vol. II, (1960), p. 957.
MacDonald, "Pulp & Paper Manufacture Control, Secondary Fib., Struct. Board," (1969) p. 427, vol. II.

*Primary Examiner*—S. Leon Bashore
*Assistant Examiner*—Peter Chin
*Attorney, Agent, or Firm*—Robert M. Krone; Joseph J. Kelly

[57] ABSTRACT

Perlite insulation board is produced on a rotary vacuum forming machine utilizing an aqueous slurry containing ultrafine perlite particles. The fine perlite particles slow down the rate of stock deposition on the facing wire of the rotary vacuum former, and permit the rotary vacuum former to operate at a desirable forming speed.

8 Claims, No Drawings

MANUFACTURE OF PERLITE INSULATING BOARD ON A CYLINDER MACHINE

This is a Continuation of application Ser. No. 259,703, filed June 5, 1972 now abandoned.

FIELD OF THE INVENTION

This invention relates to a process for producing a thermal insulating board. More particularly, the invention relates to the production of thermal insulating boards containing perlite and a fibrous material.

BACKGROUND OF THE INVENTION

Conventional commercial perlite board used for built-up roof insulation contains approximately 70% perlite by weight and 30% organic materials, such as asphalt, cellulosic fiber, and starch. Normal production on a Fourdrinier board former requires that the stock drainage characteristics be controlled within a narrow range to avoid compromising production speed on the Fourdrinier machine or drying rate in the drying oven. A relatively fast drainage rate is preferred.

The formation of a perlite board having a conventional formula on a rotary vacuum former, a cylinder machine, is difficult because solids in the aqueous slurry tend to deposit at too rapid a rate on the facing wire of the rotary vacuum filter. While some control can be exercised by use of a rotating brush roll which returns the excess portion of the stock to the system, when this recycled portion exceeds approximately 10% of the mass thickness, the stock consistency equilibrium is disrupted, and control of the process is difficult or impossible.

It has also been proposed to reduce the degree of vacuum on the cylinder to control stock deposition. However, sufficient vacuum must be maintained on the drum to prevent the deposited board stock from slipping back into the vat as it emerges from the vat.

A reduction of the solids content of the aqueous slurry in the cylindrical vacuum forming machine cannot be used effectively to control the rate of stock deposition, in view of the tendency of expanded perlite to float when it is in a dilute suspension. While the production of perlite insulating board on a Fourdrinier machine has been standardized, and produces good results, the initial capital expenditure, and the physical size of a Fourdrinier machine and its associated equipment makes it desirable to develop an improved process for the production of perlite insulating board on rotary vacuum forming equipment.

SUMMARY OF THE INVENTION

The present invention provides an improvement in a process for producing perlite insulating board on a cylinder machine in which an aqueous slurry containing perlite, fiber, and binder is deposited on a rotating cylindrical screen. The improvement comprises controlling the rate of stock deposition from the slurry by incorporating fine expanded perlite particles in the slurry, with at least about 90% of the perlite particles being able to pass through a 100 mesh screen prior to their expansion. Preferably, the expanded perlite particles have a bulk density of about 4.5-10.0 lb/cu. ft., and at least 50% by weight of the perlite particles will pass a 200 mesh screen prior to expansion.

From 1.5 to 7.0% of a starch binder can be present in the aqueous slurry along with the fine perlite particles, to further reduce the rate of stock deposition.

Conventional commercial perlite insulating board formed on a Fourdrinier machine conforms to well-established formula, density, conductivity, and physical property relationships. That is, conductivity improves and physical properties deteriorate as product density is decreased. The commercial perlite insulating board presently being marketed is a compromise between density and acceptable physical property levels. The density level selected, generally, 10–12 lbs/cu. ft., establishes the limit of product conductivity which from a practical standpoint can be obtained. The present invention provides a board having a density, conductivity, and physical property interrelationship which is better than or at least the equal of Fourdrinier formed products in most respects.

The use of ultrafine particles of perlite in accordance with the present invention is believed to increase the ratio of air volume to perlite volume in the product board, and to thus reduce the conductivity of the thermal insulating board, since the conductivity of air is about 0.17 and the conductivity of perlite is about 0.30. In addition, the reduction in the volume percent of the board occupied by perlite permits the development of a more extensive and stronger fiber matrix. Perlite board containing fine, as opposed to conventionally sized perlite, thus exhibits significantly higher strength to density ratios. For example, a board formed on a cylinder machine using fine perlite particles can achieve a modulus of rupture of 90 psi at a board density of 9.5 lb/cu. ft., while a Fourdrinier board formed with identical ingredients, but containing conventionally sized perlite particles, possesses a modulus of rupture of only about 65 psi at a density of 10.5 lb/cu. ft. Significantly, the board formed of fine perlite on a cylinder machine and having a board density of 9.5 lb/cu. ft. has a conductivity of 0.342 while the 10.5 lb/cu. ft. board formed on a Fourdrinier machine has a conductivity of 0.385.

DETAILED DESCRIPTION OF PREFERRED EMBODIMENTS OF THE INVENTION

The present invention provides an improvement in a process for producing perlite board on a cylinder machine from a dilute aqueous slurry containing perlite, fiber, and binder. In general, the aqueous slurry contains an extremely fine grade of perlite which is substituted for the conventional larger sized perlite particles used in slurries formed on a Fourdrinier machine. The other components, and the proportions of components, of the slurry used in the present process correspond to the components and proportions used in the aqueous slurries used to form perlite boards on Fourdrinier machines.

The solids portions of the aqueous slurry formed in accordance with this invention, usually comprises 50-80% by weight of fine expanded perlite particles. These perlite particles have an expanded density of from 6.0–8.0 lb/cu. ft., and preferably a density of from 7.0–7.5 lb/cu. ft. At least about 90% of the fine perlite particles are able to pass through a 100 mesh screen prior to their expansion. Preferably, at least 50% by weight of the perlite particles will pass a 200 mesh screen prior to expansion. Expansion results in a size gradation in which at least about 20 to 30% of the perlite still passes through a 325 mesh screen.

This fine grade of perlite, at identical weight levels, occupies less of the volume of the product board than is occupied by the perlite of the conventional larger sizes. As a consequence, if the product thickness and formulation remain unaltered, the volume of air in the finished product containing fine perlite is increased. This increase in the volume of air in the finished product produces two beneficial effects. First, the increased ratio of air volume to perlite volume which is obtained causes a reduction in the conductivity of the product board, since the conductivity of air is 0.17 and the conductivity of perlite is 0.30. Secondly, the reduced perlite volume permits the formation of a more extensive and stronger fiber matrix. This stronger fiber matrix produces a significantly higher strength to density ratio for board containing fine, as opposed to conventionally sized perlite.

In general, the concentration of solids in the slurry used forming the perlite board on the cylinder machine can be 3.5 to 6.0%. No problems of dewatering have been observed. In general, in addition to the perlite particles, the slurry on a solids basis will contain 10-40% fiber, and 5-30% adhesive or binder. To provide adequate strength, the ratio by weight of fiber to perlite should preferably not be less than 1 to 8. A ratio by weight of fiber to perlite of about 1 to 3 is preferred.

Newsprint or similar wood or vegetable fibers are usually present in amounts of from 10 to 40% by weight of the solids in the slurry. However, inorganic fibers, such as glass, mineral wool or asbestos fibers can be substituted for part of the organic fiber. If a substantial amount of inorganic fiber is present in the slurry, it is desirable that the total weight percentage of fiber be above 22% by weight, since the inorganic fiber has a higher density than the preferred organic fibers.

Various binder or adhesive ingredients can be incorporated in the aqueous slurry, depending somewhat on the uses and desired properties of the finished board. Suitable binder or adhesive materials include bituminous emulsions, sodium silicate, pitch, bentonite, and various resins and dispersions of starch. Emulsified asphalt has the advantage of low cost, and it gives the product excellent water repellency. Synthetic organic resins can be employed as binders, but generally are undesirable from the cost standpoint. In presently preferred embodiments of the invention, the slurry contains asphalt emulsions and starch at levels of about 3.5 to 9% and 1.5 to 7.0% respectively, based on the total weight of solids in the slurry. Generally, it is desirable to incorporate cooled starch in the aqueous slurry, because swollen starch tends to assist in slowing down the pick up of solids on a rotary vacuum forming machine.

In the practice of the process, a cylinder forming machine, such as an Oliver, is usually operated at the lowest vacuum level which will provide sufficient vacuum on the drum to prevent slippage of the deposited fiber-perlite matrix on emergence from the vat of the machine. In general, the operating vacuum will be from 4 to 6 inches of mercury. Preferably, the screen of the rotary vacuum filter is selected to be very fine, 30 to 60 mesh, since the fine particles used in accordance with this invention may pass a coarser mesh screen.

Generally, the perlite board comes from the dewatering step substantially dewatered. Usually, one or more sets of pressing rolls are used to further dewater the board stock. Subsequently, the board is dried and cut to size.

For a clearer understanding of the invention, a specific example is set forth below. This example is intended to be illustrative and should not be understood as limiting the scope and underlying principles of the invention in any way. All percentages listed in the specification and claims are weight percentages unless otherwise noted. All screen sizes are based on the U.S. Standard Sieve Series, unless otherwise noted.

In accordance with the invention, a perlite board is formed on an Oliver rotary vacuum forming machine from a 4.5% solids aqueous slurry which has a solids content of 70% perlite particles having the ore specification set out below, 22% newsprint, 5% asphalt (supplied as an asphalt emulsion), and 3% starch.

| Ore Specification of Perlite Used in the Example. | |
|---|---|
| Mesh | % by weight |
| +100 | 0-8 |
| -100+200 | 20-47 |
| -200 | 50-75 |

Perlite board of nominal 1 inch dry thickness is formed on the Oliver machine at the rate of 15 to 25 lineal feet per minute using a vacuum of 4 to 6 inches of mercury.

A board having a density of 9.5 lb/cu. ft. is produced which exhibits a modulus of rupture of 90 psi. Significantly, the board has a $k$ factor of 0.342. In contrast, perlite board formed on a Fourdrinier machine containing 70% of standard expanded perlite, 22% newsprint, 6% asphalt, and 2% starch exhibits a board density of about 10.5 lb/cu. ft. and has a modulus of rupture of only 65 psi. The conductivity of this Fourdrinier board is 0.385.

From this example, it can be seen that the use of a small perlite particle in the aqueous slurry fed to a cylinder machine produces a product having a low thermal conductivity, and a higher strength to density ratio than is exhibited by boards containing perlite particles of a conventional size distribution.

The fine grade of perlite utilized in accordance with this invention is normally considered a waste product unsuitable for production of perlite board on a Fourdrinier machine.

What is claimed is:

1. An improvement in a process for producing perlite insulating board on a cylinder machine in which an aqueous slurry containing perlite, fiber, and binder is deposited on a rotating cylindrical screen, the improvement comprising: controlling the rate of stock deposition from the slurry by incorporating fine expanded perlite particles having a density of from 4.5-10. lb./cu. ft. in the slurry, with at least about 90% of the perlite particles being able to pass through a 100 mesh screen prior to their expansion, at least 50% by weight of the perlite particles being able to pass a 200 mesh screen prior to their expansion and at least about 20 to 30% by weight of said perlite particles being able to pass a 325 mesh screen after their expansion.

2. The improved process of claim 1 in which the fine expanded perlite comprises 50-80% by weight of the solids in the slurry.

3. The improved process of claim 1 in which the expanded perlite particles have a bulk density of 6.0-8.0 lb./cu. ft.

4. The improved process of claim 1 in which from 3.5 to 9% starch binder is present in the aqueous slurry.

5. The improved process of claim 1 in which the fine expanded perlite comprises about 70% by weight of the solids in the slurry.

6. The improved process of claim 1 in which the fiber is newsprint and the weight ratio of fiber to fine expanded perlite is at least 1 to 8.

7. The improved process of claim 5 in which the expanded perlite has a density of from 6.0–8.0 lb./cu. ft.

8. The improved process of claim 5 in which the aqueous slurry includes about 5% asphalt and about 3% starch.

* * * * *